US007195820B2

(12) United States Patent
Hong et al.

(10) Patent No.: US 7,195,820 B2
(45) Date of Patent: Mar. 27, 2007

(54) CORE-SHELL POLYMERS HAVING HYDROPHILIC SHELLS FOR IMPROVED SHELL COVERAGE AND ANTI-BLOCKING PROPERTIES

(75) Inventors: Sheng Hong, Norristown, PA (US); Rosangela Pirri, Montardon (FR); Brian Edgecombe, Hopewell, NJ (US)

(73) Assignee: Arkema Inc., Philadelphia, PA (US)

( * ) Notice: Subject to any disclaimer, the term of this patent is extended or adjusted under 35 U.S.C. 154(b) by 0 days.

(21) Appl. No.: 10/980,720

(22) Filed: Nov. 3, 2004

(65) Prior Publication Data
US 2005/0154140 A1 Jul. 14, 2005

Related U.S. Application Data

(60) Provisional application No. 60/528,239, filed on Dec. 9, 2003.

(51) Int. Cl.
*A61K 9/50* (2006.01)
*B01J 13/03* (2006.01)
*B32B 5/16* (2006.01)
(52) U.S. Cl. ............................. 428/402.24; 427/213.3; 427/213.31; 264/4.1; 106/285
(58) Field of Classification Search ................ 525/301, 525/193; 523/201; 260/835, 836
See application file for complete search history.

(56) References Cited

U.S. PATENT DOCUMENTS 4,034,013 A 7/1977 Lane
4,086,300 A 4/1978 Owens et al.
4,278,576 A 7/1981 Goldman
4,440,905 A 4/1984 Dunkelberger
4,463,131 A 7/1984 Grandzol et al.
4,942,188 A * 7/1990 Hamersma et al. .......... 523/212
5,321,056 A 6/1994 Carson et al.
5,360,865 A 11/1994 Aoyama et al.
5,409,967 A 4/1995 Carson et al.
5,773,520 A 6/1998 Bertelo et al.
6,001,922 A 12/1999 Clark et al.
6,130,290 A 10/2000 Troy et al.
6,288,174 B1 * 9/2001 Ikegami et al. ............. 525/301
6,395,829 B1 * 5/2002 Miyamoto et al. ............ 525/71
6,407,173 B1 6/2002 Uemura et al.
2002/0165296 A1 * 11/2002 Cruz et al. .................. 523/201

FOREIGN PATENT DOCUMENTS

| EP | 0 654 454 | 5/1995 |
| EP | 1 039 339 | 9/2000 |
| EP | 1 086 966 | 3/2001 |
| EP | 1 095 982 | 5/2001 |
| EP | 1 236 750 | 9/2002 |
| JP | 54-548850 | 9/1977 |

* cited by examiner

*Primary Examiner*—James J. Seidleok
*Assistant Examiner*—Saira B. Haider
(74) *Attorney, Agent, or Firm*—Thomas F. Roland

(57) ABSTRACT

The present invention relates to core-shell polymers having a hydrophilic copolymer shell, and a high level of core material of from 75 to 95 weight percent. The hydrophilic shell provides better coverage of the core resulting in better powder properties such as anti-blocking. The hydrophilic shell also allows for a thinner shell and a larger elastomeric core. Core-shell polymers of the invention are especially useful as impact modifiers for plastic materials.

11 Claims, 4 Drawing Sheets

Micrograph of Example 13 Latex

Figure 5. Micrograph of Example 12 Latex:
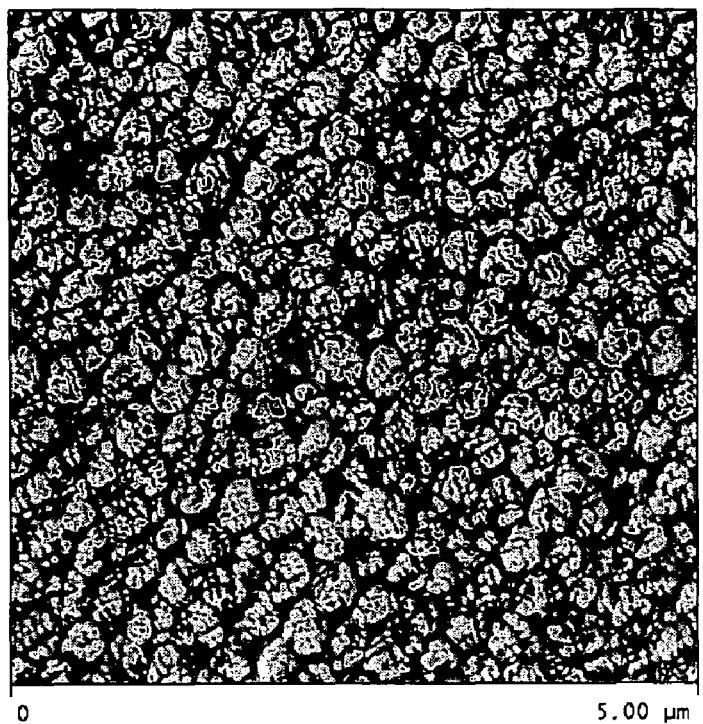
Figure 6. Micrograph of Example 13 Latex
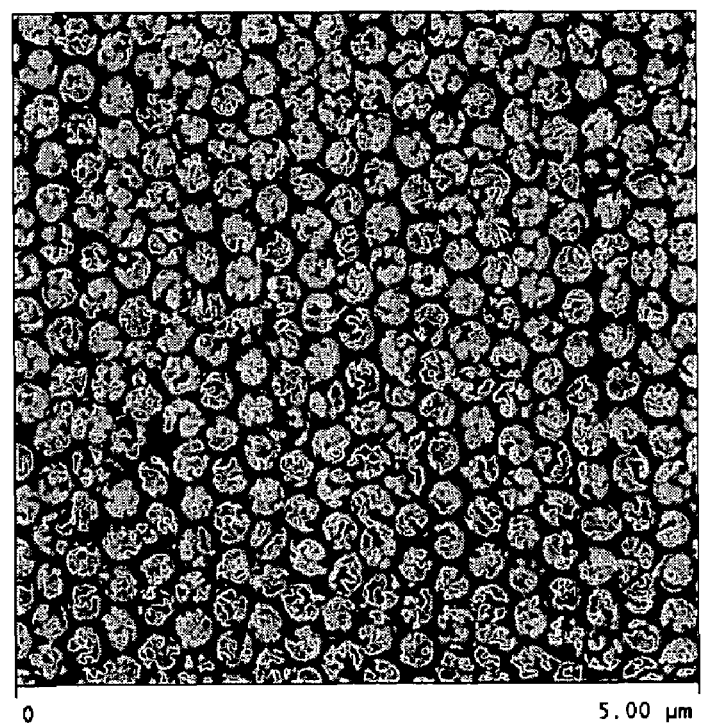

Figure 7: Picture of dried solids of Example 12
Figure 8: Picture of dried solids of Example 13

CORE-SHELL POLYMERS HAVING HYDROPHILIC SHELLS FOR IMPROVED SHELL COVERAGE AND ANTI-BLOCKING PROPERTIES

BACKGROUND OF THE INVENTION

This application claims benefit under U.S.C. § 119(e) of U.S. provisional application 60/528,239, filed Dec. 9, 2003.

FIELD OF THE INVENTION

The present invention relates to core-shell polymers having a hydrophilic copolymer shell, and a high level of core material. The hydrophilic shell provides better coverage of the core resulting in better powder properties. The hydrophilic shell also allows for a thinner shell and a larger elastomeric core while still maintaining good powder handling characteristics. The core-shell polymer provides excellent processing characteristics, including improved spray-drying. Core-shell polymers of the invention are especially useful as impact modifiers for plastic materials.

BACKGROUND OF THE INVENTION

Synthetic resins are widely used as engineering plastics in a variety of end-uses, such as building materials and automobile parts. The engineering plastics have good physical and chemical resistance, and are low cost. A disadvantage of some engineering plastics is that they have poor impact strength. Poor impact strength of these materials may be overcome by blending impact modifiers with the resins.

Impact modifiers generally consist of low-Tg, elastomeric polymers. Unfortunately the low-Tg polymer particles are typically difficult to handle. They are tacky and tend to stick together (blockiness), forming clumps or agglomerates during processing and storage. The agglomerates may be difficult to separate and disperse into the engineering polymer matrix, leading to a less than optimal modification of the plastic.

Core shell impact modifiers typically have rigid high $T_g$ polymers in their outmost have good anti-blocking properties and are easy to handle. They can also be spray-dried or coagulated.

It is known in the art that the rubber component of a core shell impact modifier provides the impact toughening properties. It is thus desired in the industry to maximize the rubber content in the modifier yet still maintain good anti-blocking properties and excellent powder handling characteristics.

Unfortunately, when the percentage of shell material is decreased, there is an increased likelihood for incomplete coverage of the particle. When the elastomeric core is incompletely covered, it can stick to other particles and form agglomerates. The rubbery agglomerates are difficult to process and also lead to poorer properties of the engineering plastics. Core-shell compositions exemplified in the art have shell levels of at least 25 percent and normally greater than 30 percent by weight to ensure complete coverage of the elastomeric core.

One method of preventing the formation of agglomerates is to blend hard particles with the impact modifier, as disclosed in U.S. Pat. Nos. 4,278,576, and 4,440,905. This method does not teach or demonstrate how to modify the core shell impact modifier itself so that improved shell coverage and better powder characteristics can be achieved.

Hydroxy alkyl (meth)acrylate monomers have been incorporated into the shell to improve compatiblization of the shell with the engineering plastic matrix. The use of hydroxy-functional monomers in the shell has been described in U.S. Pat. Nos. 5,321,056 and 5,409,967. These references describe particles having 10 to 60 percent shell, while teaching that the rubber phase concentration of the impact modifier composition be kept relatively low (column 4 lines 63–68), and exemplifying only particles having at least 35 percent shell.

JP 54-48850 describes the use of polymers made from hydroxyl-functional monomers for use as impact modifiers. In one instance, 10 to 40 percent of a hydroxyl-functional polymer latex is blended with 60 to 90 percent of a rubbery polymer latex and solidified with magnesium sulfate. The "rubbery polymer", as described in Examples 1–3 is a core-shell polymer having a butadiene core and a styrene/acrylonitrile shell. The resulting blend consists of core/shell butadiene/styrene-acrylonitrile particles, and separate vinyl particles having hydroxyl groups. The core-shell polymer is never described as having hydroxy groups in the shell. In another embodiment a multilayer structure having 70 percent core and 30 percent hydroxy-functional shell is produced by sequential polymerization.

U.S. Pat. No. 6,130,290 describes a core-shell particle having a two-part shell. The outer shell contains a hydroxy alkyl (meth)acrylate copolymer, while the inner shell does not. The Examples describe particles having from 60–70 percent rubbery core and 30–40 percent of the multi-layered shell consisted of rigid high $T_g$ polymers.

None of the prior arts teaches or demonstrates that the use of hydrophilic comonomers can affect the shell coverage on the rubber core and/or powder performance of core/shell type particles.

The problem solved by the present invention is to find a means to reduce the level of shell material without losing powder properties, in other words to provide more complete shell coverage when less than the usual amount of shell monomer is used.

While not being bound by any particular theory, it is believed that a significant portion of the shell monomer diffuses into the core, and polymerizes inside the core rather than on the surface of the core polymer. Thus, when the shell monomer mixture is polymerized, only some of the monomer mixture actually forms a polymer shell covering the core. Moreover, the polymer shell that forms may be of an uneven thickness and/or incomplete. Evidence of poor coverage can often be observed through the measurement of the minimum filming temperature of the core-shell polymer latex or through direct microscopy study (such as atomic force microscopy) of the core-shell polymer particles.

Surprisingly, it has been discovered that the use of low levels of hydrophilic monomers to form a copolymer in the shell layer leads to better shell coverage of the core polymer. Thermodynamic considerations suggest that a hydrophilic monomer, and a copolymer formed from the hydrophilic monomer should prefer to remain on the surface of the particle rather than migrating into the core. Shell coverage is improved by thermodynamic preference. Better efficiency of shell coverage means that less shell monomer needs to be used in order to attain good powder properties, allowing for larger elastomeric cores.

SUMMARY OF THE INVENTION

It is an objective of the invention to prepare two-stage or multi-stage core-shell polymers with good powder performance. This includes compositions whose powder performance is problematic.

It is a further objective of the invention to produce core-shell impact modifiers having high percentages of elastomeric cores.

It is a further objective of the invention to prepare high core content core-shell particles having good anti-blocking properties.

A further objective of the invention is to improve the processability of core-shell polymers having large elastomeric cores. Particularly of interest is spray-drying of a core shell emulsion.

The objectives have been met with the synthesis of a core-shell polymer particle comprising:
a) from 75 to 95 weight percent of a core comprising an elastomeric polymer, wherein said elastomeric polymer has a glass transition temperature less than 20° C.; and
b) from 5 to 25 weight percent of a copolymeric shell wherein said shell copolymer is derived from one or more hydrophylic monomer and at least one other monomer copolymerizable with said hydrophilic monomer, said hydrophilic monomer comprising from 0.5 percent to 30 percent by weight of the monomers from which said shell polymer is derived and said hydrophilic shell copolymer comprises at least 5 percent by weight of the shell.

BRIEF DESCRIPTION OF THE DRAWINGS

FIG. 5: Is a micrograph of the latex of Example 12.

FIG. 6: Is a micrograph of the latex of Example 13.

FIG. 7: Is a picture of the dried solid product of Example 12.

FIG. 8: Is a picture of the dried solid product of Example 13.

DETAILED DESCRIPTION OF THE INVENTION

By "core", as used herein, is meant the outermost elastomeric layer and all stages or layers inside the outermost elastomeric polymer stage. The core may be a single elastomeric phase, or may consist of multiple phases or layers of polymer. The non-elastomeric and elastomeric polymers in the core may be the same or different from other polymers in the core-shell structure. The core makes up at least 75 percent by weight of the core-shell polymer, preferably at least 80 percent, and mort preferably from 85 to 95 percent by weight.

By "polymers", as used herein, is meant homopolymers and copolymers—with copolymers including polymers formed from two or more different monomers, such as terpolymers, etc. The copolymer may be random, block, or graft in nature. The polymers may have any architecture, such as branched, star, or comb polymers.

By "elastomeric" and "elastomer", as used herein, is meant any polymer or copolymer having, a glass transition temperature (Tg) of less than 25° C. Preferably the elastomeric polymer has a Tg of from −120 to 0° C. Most preferably the elastomeric polymer has a Tg, of from −90 to −10° C.

By "shell", as used herein, is meant all layers of the multilayer polymer particle beyond the outermost elastomeric layer.

Figure 1:
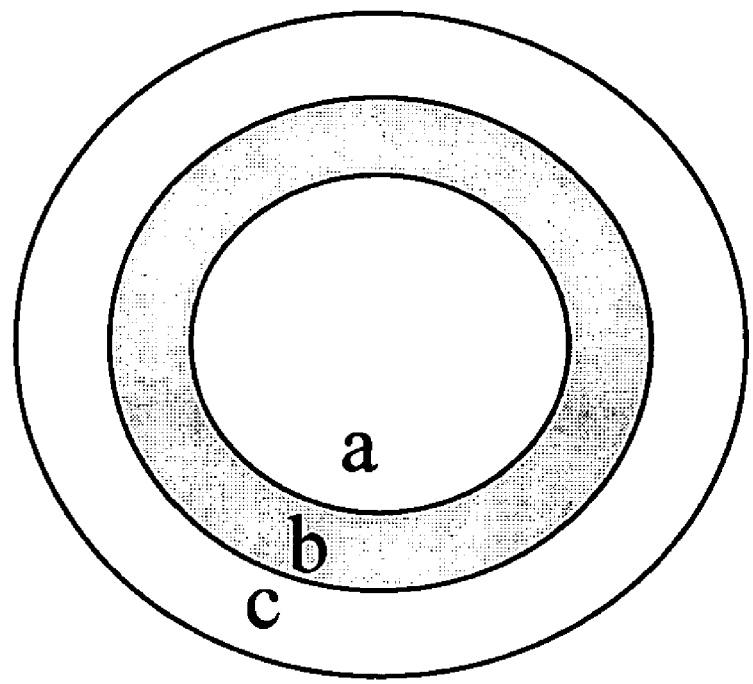
FIG. 1: A general core-shell polymer having a core wherein a hard hydrophilic copolymer shell (c) covers or partially covers an elastomeric polymer that forms the outermost layer (b) of the core. The interior portion (a) of the core may contain either hard (glassy) or soft (elastomeric) layers or phase domains.
Figure 2:
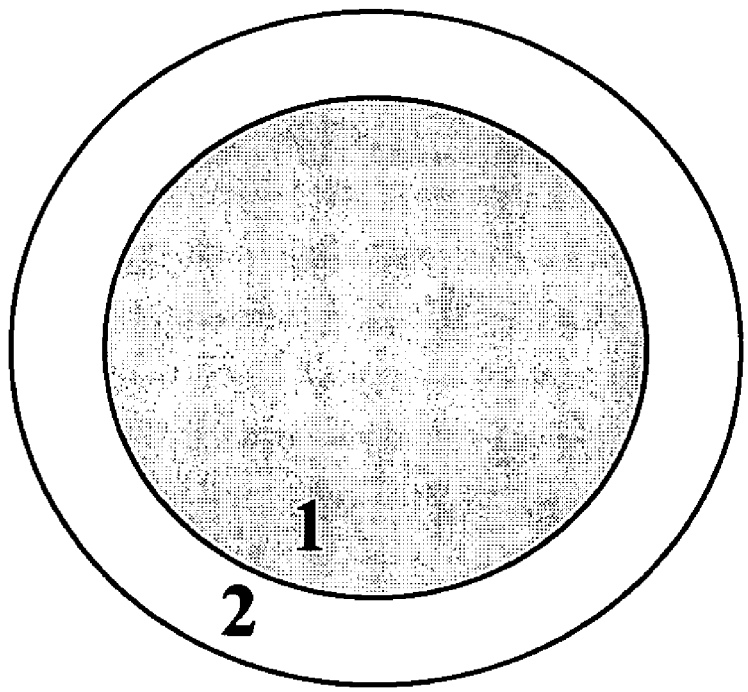
FIG. 2: A two stage core-shell polymer having an elastomeric core and a hard hydrophilic copolymer shell.
Figure 3:
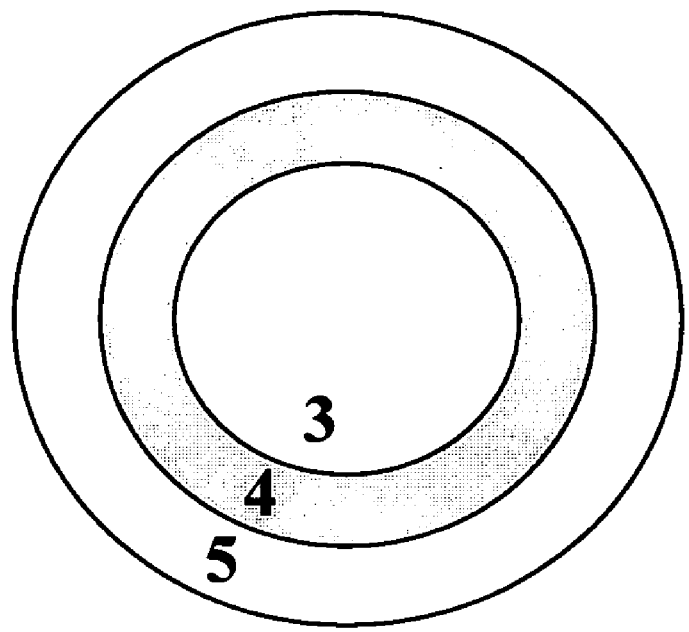
FIG. 3: A three stage core-shell polymer having a core consisting of a hard polymer center surrounded by an elastomeric polymer layer, and a hard hydrophilic copolymer shell.
Figure 4:
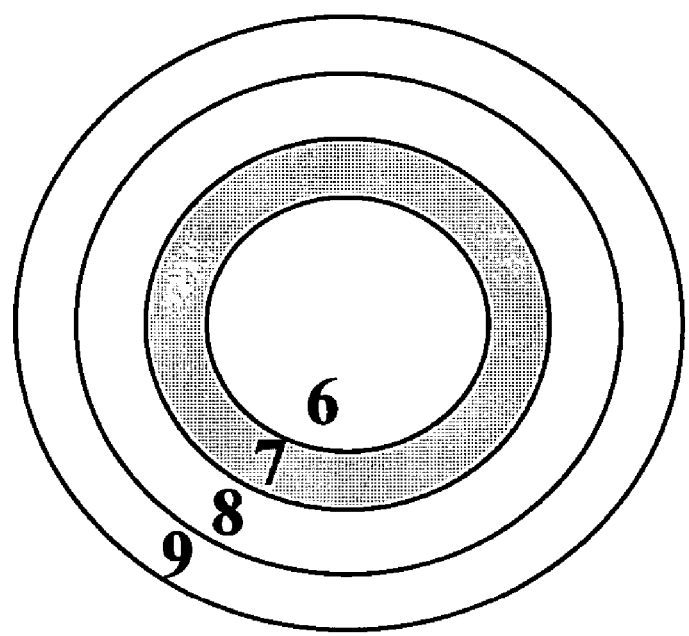
FIG. 4: A four stage core shell polymer having a core consisting of a hard polymer center surrounded by an elastomeric polymer layer, and a 2-stage shell consisting of a hard hydrophilic copolymer layer, surrounded by another hard layer.

Core-shell polymers encompassed by the scope of the invention include, but are not limited to, those illustrated in the drawings. In FIG. 1, the general scope of the core-shell polymers is represented. The other figures, 2–4, are specific, non-limiting examples of core-shell polymers that fall within the scope of the invention. For example, in FIG. 2 a core-shell polymer is illustrested in which "1" is composed of an elastomeric polymer and "2" is composed of a hard (glassy) polymer. In FIG. 3, a core-shell polymer is illustrasted in which "3" is composed of a hard (glassy) polymer, "4" is composed of an elastomeric polymer and "5" is composed of a hard (glassy) polymer. In FIG. 4, a core-shell polymer is illustrasted in which "6" is composed of a hard (glassy) polymer, "7" is composed of an elastomeric polymer, "8" is composed of a hard (glassy) polymer, and "9" is composed of a hard (glassy) polymer. It is noted that prior art refers to specific layers functioning in various capacities such as tie-layers, intermediate layers, or grafting layers. However, within the scope of this invention no distinction is made in the function of any particular layer. The scope is defined by the glass transition temperature of the polymers and the location of the polymers within the core-shell polymer structure.

The core, as defined above, includes all layers of the multi-stage particle from the outermost elastomeric layer inward. The core may be a single elastomeric stage, a hard layer surrounded by an elastomeric layer, or any number of elastomeric and hard layers wherein the outer layer is an elastomeric polymer. The core could also be made of a matrix of hard and elastomeric materials, having an elastomeric layer as the outermost layer. At least 30 percent of the core is made of elastomeric polymer(s). Preferably at least 40 percent of the core is elastomeric polymer. Most preferably at least 50 percent of the core is elastomeric polymer.

Examples of elatomeric polymers that could be present in the core include, but are not limited to, polybutadiene, butadiene-styrene copolymers, methacrylate-butadiene-styrene terpolymers, polyisoprene, $C_2$–$C_{18}$ acrylic polymers, acrylonitrile copolymers, siloxanes or silicon containing elastomers.

In one embodiment, the elastomer is a styrene/butadiene copolymer. In another embodiment the elastomer is an acrylate/butadiene copolymer. In another embodiment the elastomer is a acrylate polymer or copolymer.

In a preferred embodiment the elastomer of the core is an acrylic polymer or copolymer. By "acrylic" is meant that the primary monomer(s) used in forming the elastomeric polymer are acrylic monomers. Preferably the acrylic polymer contains at least 80 percent by weight of acrylic monomer units. Examples of acrylic monomers useful in the invention include, but are not limited to, alkyl acrylates include n-propyl acrylate, n-butyl acrylate, amyl acryloate, 2-methylbutyl acrylate, 2-ethylhexyl acrylate, n-hexyl acrylate, n-octyl acrylate, n-decyl acrylate, n-dodecyl acrylate, 3,5,5-trimethylhexyl acrylate. Especially preferred acrylic monomers include n-butyl acrylate, n-pentyl acrylate, n-hexyl acrylate, n-heptyl acrylate, 2-ethylhexylacrylate and n-octyl acrylate and mixtures thereof. Butyl acrylate, 2-ethylhexyl acrylate and n-octyl acrylate are most preferred.

In addition to the acrylic monomer units, the acrylic elastomeric polymers may include one or more ethylenically unsaturated monomers at a level of up to 20 weight percent, and preferable up to 15 percent and most preferably up to 10 percent. The non-acrylic monomers may include, but are not limited to butadiene and styrene. In one preferred embodiment, the core polymer is a copolymer of 85 to 98, preferably 90 to 97 percent by weight of acrylic monomers(s) and 2 to 15, preferably 3 to 10 percent by weight of butadiene.

The core elastomeric polymer may advantageously include small amounts of cross-linking and/or graftlinking monomer units. Agents useful in the invention preferably are those having at least two double bonds. Examples of useful reagents include, but are not limited to, divinyl benzenes, diallyl maleate polyalcohol (meth)acrylates such as trimetylolpropane, triacrylate, or trimethacrylate, allyl (meth)acrylate, alkylene glycol di(meth)acrylates having 2 to 10 carbon atoms in the alkylene chain such as ethylene glycol di(meth)acrylate, 1,4-butanediol di(meth)acrylate, or 1,6-hexanediol di(meth)acrylate.

The polymer cores are formed by free-radical emulsion polymerization by means known in the art. Where the core contains more than one layer, the multiplayer core may be synthesized by successive free radical emulsion polymerization, as known in the art.

The shell of the present invention is composed of one or more layers of hard polymers. By hard polymer it is meant a polymer having a Tg of greater than 25° C., preferably in the range of from 40 to 150° C., and most preferably in the range of from 60 to 140° C. The shell includes at least one copolymer formed from at least one hydrophobic monomer and at least one hydrophilic component at a level of at least 0.5 weight percent, preferably from 1 to 30 weight percent, and most preferably from 1 to 20 weight percent. The hydroplilic copolymer makes up at least 20 percent, preferably from 30 to 100 percent, and most preferably from 60 to 100 percent by weight of the shell.

By "hydrophilic component" is meant a hydrophilic monomer, polymerizable surfactant or macromolecule, a chain transfer agent or other moiety imparting a hydrophilic nature to the copolymer. By "hydrophilic monomer" is meant any polymerizable monomer with a solubility of at least 6 grams of monomer per 100 grams of water, preferably with a solubility of at least 10 grams of monomer per 100 grams of water. Also, the hydrophilic monomers contain a hydrophilic functionality. Hydrophilic monomers useful in the invention include hydroxy alkyl (meth)acrylates, (meth)acrylic acid, (meth)acrylic amides, (meth)acrylic amines, polymerizable surfactants and macromonomers containing hydrophilic moieties. Examples of hydrophilic monomers include, but are not limited to 2-hydroxyethyl methacrylate, 2-hydroxyethyl acrylate, methacrylic acid, acrylic acid, hydroxypropyl methacrylate, 4-hydroxybutylacrylate, ethyl alpha-hydroxymethacrylate, allyl cellosolve, allyl carbinol, methylvinyl carbinol, allyl alcohol, methyllyl alcohol, glycidyl methacrylate, 3,4-epoxybutyl acrylate, acrylonitrile, methacrylonitrile, beta-cyanoethyl methacrylate, beta-cyanoethyl acrylate, cyanoalkoxyalkyl (meth)acrylates, such as omega-cyanoethoxyethyl acrylate, or omega-cyanoethoxyethyl methacrylate, (meth)acrylamides, such as methacrylamide or acrylamide, N-monoalkyl (meth)acrylamides, such as N-methylacrylamide or N-t-butylacrylamide or N-ethyl (meth)acrylamide, or vinyl monomers containing an aromatic ring and an hydroxyl group, such as vinylphenol, para-vinylbenzyl alcohol, meta-vinylphenethyl alcohol, vinyl pyrrolidone, and vinyl imidazole. Combinations of ethylenically unsaturated hydrophilic monomers may also be used. Preferably, the ethylenically unsaturated hydrophilic monomer is selected from 2-hydroxylethyl methacrylate, 2-hydroxylethyl acrylate, methacrylic acid, acrylic acid.

Examples of polymerizable surfactants or macromonomers with hydrophilic moieties useful in the present invention include, but are not limited to sodium 1-allyloxy-2-hydroxypropane sulfonate, phosphate methacrylate monomer, poly(ethylene glycol) methylether methacrylate, 1-methacrylamido, 2-imidazolidinone ethane.

The hydrophilic component of the polymer may also be introduced through chain transfer agents of other moieties of aq hydrophilic nature that become part of the polymer.

The shell copolymer is also formed from one or more hydrophobic ethylenically unsaturated monomers, making up from 50 to 99 weight percent of the shell. The hydrophobic monomers can include, but are not limited to, styrene, (meth)acrylonitrile, ethyl acrylate, propyl acrylate, butyl acrylate, methyl methacrylate, divinyl benzene, and acrylonitrile.

The shell of the invention makes up from 5 to 25 weight percent of the core-shell polymer, preferably 7 to 20 weight percent. If the shell is present at levels less than this, there is an increased likelihood of a non-uniform shell and some incompletely-covered core material. The exposed core material could stick with other exposed cores, leading to poor blocking. At shell levels above 25 weight percent, the advantages provided by the hydrophilic shell are not seen as easily, since the excess shell material masks the positive effect of the better coverage. The high shell levels can be disadvantageous as more shell material, and less of the core impact modifier material is present.

The core/shell polymer of the invention is synthesized by emulsion free-radical polymerization. A general procedure for producing a single core/single shell polymer particle will be described. One of skill in the art will be able to modify this procedure to form other multi-layer particles useful as impact modifiers. In a first stage, an emulsion is prepared which contains, per part by weight of monomers to be polymerized, 1 to 10 parts of water, 0.001 to 0.03 parts of an emulsifying agent, a major portion of the elastomeric monomer mixture and at least one polyfunctional crosslinking agent. The reaction mixture thus formed is stirred and maintained at a temperature ranging from 45° C. to 65° C. and preferably at a temperature in the region of 60° C. 0.001 to 0.5 parts of a catalyst which generates free radicals is then added and the reaction mixture thus formed is maintained at a temperature of, for example, between ambient temperature and 100° C. and with stirring for a period sufficient to obtain a virtually complete conversion of the monomers. The minor portion of elastomeric monomer(s) and the grafting agent, as well as, at the same time, 0.001 to 0.005 part of a catalyst which generates free radicals, are then added simultaneously to the phase thus obtained.

In a second stage, the said core is grafted with a mixture of at least one hydrophobic monomer and at least one hydrophilic monomer. To do this, an appropriate amount of the said monomer mixture is added to the reaction mixture resulting from the first stage, in order to obtain a grafted copolymer containing the desired content of grafted chains, as well as, if appropriate, additional amounts of emulsifying agent and of a radical catalyst also within the ranges defined above, and the mixture thus formed is maintained at a temperature within the abovementioned range, with stirring, until virtually complete conversion of the grafting monomers is obtained. Use may be made, as emulsifying agent, of any one of the known surface-active agents, whether anionic, nonionic or even cationic. In particular, the emulsifying agent may be chosen from anionic emulsifying agents, such as sodium or potassium salts of fatty acids, in particular sodium laurate, sodium stearate, sodium palmitate, sodium oleate, mixed sulphates of sodium or of potassium and of fatty alcohols, in particular sodium lauryl sulphate, sodium or potassium salts of sulphosuccinic esters, sodium or potassium salts of alkylarylsulphonic acids, in particular sodium dodecylbenzenesulphonate, and sodium or potassium salts of fatty monoglyceride monosulphonates, or alternatively from nonionic surfactants, such as the reaction products of ethylene oxide and of alkylphenol or of aliphatic alcohols, alkylphenols. Use may also be made of mixtures of such surface-active agents, if need be.

In one embodiment, the emulsion may be made in a semi-continuous process, preferably at reaction temperatures of from 40–90° C., and preferably from 45° C. to 65° C.

The catalysts capable of being employed, both in the abovementioned first emulsion polymerization stage and in the abovementioned second emulsion polymerization stage, are compounds which give rise to free radicals under the temperature conditions chosen for the polymerization. These compounds can in particular be peroxide compounds, such as hydrogen peroxide; alkali metal persulfates and in particular sodium or potassium persulfate; ammonium persulfate; percarbonates; peracetates, perborates; peroxides such as benzoyl peroxide or lauroyl peroxide; or hydroperoxides such as cumene hydroperoxide, diisopropylbenzene hydroperoxide, para-menthane hydroperoxide or tert-butyl hydroperoxide. However, it is preferable to use catalytic systems of redox type formed by the combination of a peroxide compound, for example as mentioned above, with a reducing agent, in particular such as alkali metal sulfite, alkali metal bisulfite, sodium formaldehyde sulfoxylate (NaHSO$_2$.HCHO), ascorbic acid, glucose, and in particular those of the said catalytic systems which are water-soluble, for example potassium persulfate/sodium metabisulfite or alternatively diisopropylbenzene hydroperoxide/sodium formaldehyde sulfoxylate.

It is also possible to add, to the polymerization mixture of one and/or other of the stages, chain-limiting compounds, and in particular mercaptans such as tert-dodecyl mercaptan, isobutyl mercaptan, n-octyl mercaptan, n-dodecyl mercaptan or isooctyl mercaptopropionate, for the purpose of controlling the molecular mass of the core and/or of the chains grafted onto the nucleus, or alternatively compounds such as phosphates, for the purpose of controlling the ionic strength of the polymerization mixture.

The reaction mixture obtained on conclusion of the second emulsion polymerization stage, which is composed of an aqueous emulsion of the polymer according to the invention, is then treated in order to separate the said polymer therefrom. To do this, it is possible, for example, to subject the emulsion, according to the surfactant used, to a coagulating treatment by bringing into contact with a saline solution (CaCl$_2$ or AlCl$_3$) or a solution acidified with concentrated sulfuric acid and then to separate, by filtration, the solid product resulting from the coagulating, the said solid product then being washed and dried to give a graft copolymer as a powder. It is also possible to recover the polymer contained in the emulsion by using a spray-drying technique, drum drying, freeze-drying or other means known in the art. During the process, additives such as talc may be used to aid in processing the powder. Hard particles may be used in con unction with the core-shell particles of the invention to further improve anti-blocking and processing properties.

The resulting, additive exists in the form of a powder, the particle size of which can range from a few microns, for example 0.05 to 5 microns, to 200 to 450 microns, the said particle size depending on the technique used to separate the graft copolymer from the emulsion polymerization mixture.

Advantages of the core-shell polymer of the present invention are that it enables a "better" spray drying in that a higher bulk density may be achieved under the same conditions, of the same bulk density may be achieved under harsher conditions which allow for a greater through-put of material. The core-shell particles of the present invention may be combined with other solid particles to further improve anti-blocking.

The process for forming the core-shell polymer of the invention having a hydrophilic hard shell is also useful in any applications where a minimal amount of shell polymer is desired.

In one preferred embodiment, the core-shell polymer is useful as an impact modifier for plastics. Plastic materials benefiting from the use of the novel impact modifiers include, but are not limited to polyvinyl chloride, chlorinated polyvinyl chloride, polymethymethacrylate, polyethylene terephthalate, polycarbonate, polybutylene terephthlate, polyvinylidiene difuloride and mixture thereof.

The core-shell impact modifier is blended with the plastic material at a level of from 0.5 to 70 percent by weight, and preferably 2 to 55 percent by weight, based on the weight of the plastic material. The impact modified may be blended into the plastic by standard means such as melt extrusion, compaction, roll mill etc.

In addition to the plastic material and the impact modifier, other additives may also be added at usual levels. Typical additives include, but are not limited to, processing aids, lubricants, anti-oxidants, stabilizer etc.

The impact modified thermoplastic composition according to the invention can be prepared by any method which makes it possible to produce a homogeneous mixture containing a thermoplastic polymer, the impact additive according to the invention and optionally other additives. It is possible, for example, to dry-mix the ingredients constituting the resin composition, then to extrude the resulting mixture and to reduce the extrudate to pellets. When the thermoplastic polymer is obtained by emulsion polymerization, it may be convenient to mix the emulsion containing the core-shell additive according to the invention with the emulsion of the thermoplastic polymer and to treat the resulting emulsion in order to separate therefrom the solid product which it contains, as described above with respect to the separation of the core-shell polymer.

Additives, other than the impact modifier, may optionally be present in the resin compositions. These additives include, but are not limited to pigments, dyes, plasticizers, antioxidants, heat stabilizers, processing additives or lubricants.

Since the core-shell particles of the invention exhibit less blockiness, they are also more easily processed during a melt process, and exhibit fewer gels or aggregates in the final product. The existence of a more uniform distribution of an impact modifier in the final product leads to both a more impact-resistance product, and also to an enhancement of optical properties.

In another preferred embodiment, a core-shell polymers has three sequentially-produced polymer stages characterized by:

(a) a non-elastomeric, relatively hard first stage having a glass transition temperature of greater than 25° C., polymerized from a mixture of the monomer methyl methacrylate at a level of 50–85 weight percent, other alkyl acrylates or alkyl methacrylates wherein the alkyl group consists of 1 to 8 carbon atoms and is present at a level of 1–50 weight percent
along with 0 to 10 weight percent of a copolymerizable polyfunctional crosslinking monomer, and 0 to 10 weight percent of a copolymerizable graftlinking monomer having two or more addition polymerizable unsaturated reactive groups which participate in the polymerization reaction at substantially different rates, such as an allyl, methallyl or crotyl ester of an $\alpha,\beta$-unsaturated carboxylic acid or diacid;

(b) an intermediate elastomeric stage polymerized in the presence of a product containing the first stage from a monomer mixture comprising 50 to 99.9 weight percent of an alkyl acrylate and/or alkyl methacrylate mixtures thereof wherein the alkyl groups contain 1 to 8 carbon atoms, 0 to 49.9 weight percent of a copolymerizable monoethylenically unsaturated monomer, 0 to 5.0 weight percent of a copolymerizable polyfunctional crosslinking monomer and 0.05 to 5.0 weight percent of a copolymerizable graftlinking monomer as described above, said elastomeric stage further characterized in that it would exhibit a glass transition temperature of 25° C. or less if the monomers were polymerized in the absence of the product containing the first stage; and (c) a, relatively hard, final stage polymerized in the presence of a product containing the first and second stages from a mixture of the monomers described in (a) with the specific addition of a hydrophilic monomer, preferable at the level of 0.5 to 30 weight percent, most preferably at the level of 1 to 20 weight percent versus the total monomer in the third stage.

Preferably the multi-stage polymer is a three stage composition wherein the stages are present in ranges of 5 to 60 percent by weight, preferably 10 to 50 percent, of the first stage (a), 20 to 70 percent, preferably 30 to 60, of the elastomeric stage (b), and 5 to 25 percent, preferably 10 to 20, of the final stage (c), all percentages based on the total weight of the three-stage polymer.

The multi-stage polymer can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers (which term includes copolymers as well as homopolymers) which are prepared in aqueous dispersion or emulsion and in which successive monomer changes are polymerized onto or in the presence of a preformed latex prepared by the polymerization of a prior monomer charge and stage. In this type of polymerization, the succeeding stage is attached to and intimately associated with the preceding stage. Thus, the sequentially prepared polymers of the present invention are made by a process in which the total particle content is substantially constant upon completion of the first-stage polymerization, i.e., new additional and distinct particles are avoided after formation of the first-stage particle.

The polymerizations are carried out in the presence of an initiator and may include a polymerization regulator which serves as a chain transfer agent. The final particle size of the sequentially produced polymer may vary from 100 to 350 nm with the preferred range being 200 to 300 nm.

The type and level of emulsifier utilized controls the particle size of the intermediate-stage latex particles. For the most part, the soaps normally used in emulsion polymerization can be used satisfactorily provided care is exercised in utilizing the minimum amount necessary to give the desired result and the polymer is isolated by coagulation. If the latex is isolated by spray drying, the selection of emulsifier becomes more critical since it remains with the polymer.

The level of emulsifier is typically below 5% by weight and preferably below one percent by weight, most preferably 0.1 to 0.6%, based on the total weight of polymerizable monomers charged in all stages, though in one emdodiment the level is in the range of 3–4.5%. Useful emulsifying agents include common soaps, alkylbenzenesulfonates, such as sodium dodecyl benzenesulfonate, alkylphenoxypolyethylene sulfonates, sodium lauryl sulfate, salts of long-chain amines, salts of long-chain carboxylic and sulfonic acids, etc. In general, the emulsifier should be compounds containing hydrocarbon groups of 8–22 carbon atoms coupled to highly polar solubilizing groups such as alkali metal and ammonium carboxylate groups, sulfate half ester groups, sulfonate groups, phosphate partial ester groups and the like.

The polymerization medium in each stage will contain an effective amount of a suitable free radical generating polymerization initiator, which is activated either thermally or by an oxidation-reduction (or redox) reaction. The preferred initiators are those which are activated thermally, such as persulfates; however, redox initiators may be used. Examples of suitable oil-soluble, water-insoluble initiators are combinations such as cumene hydroperoxide-sodium metabisulfite, diisopropylbenzene hydroperoxide-sodium formaldehyde sulfoxylate, tertiary butyl peracetate-sodium hydrosulfite, cumene hydroperoxide-sodium formaldehyde sulfoxylate, etc. Water-soluble redox initiators may also be used; initiator combinations are sodium persulfate-sodium hydrosulfite, potassium persulfate-sodium formaldehyde sulfoxylate, etc.

The multi-stage sequential emulsion polymerization can be carried out at temperatures ranging from about 0° C. to 125° C., with 30° C. to 95° C. being preferred. The polymerization medium may contain, in accordance with known practice, a chain transfer agent such as tertiary dodecyl mercaptan, secondary butyl mercaptan, normal dodecyl mercaptan, and the like, particularly for limiting, where desired, the molecular weight of stages containing lower alkyl methacrylate. The free radical initiator will be used in an effective amount, which will vary depending on the monomers, the temperature and the method of addition, but, generally, the quantity of initiator will vary from about 0.001 to 2% by weight in each polymerization stage based on the weight of the monomer charge but should not exceed about 5% by weight based on the total weight of the monomers charged in all stages.

The reaction mixture obtained on conclusion of the third emulsion polymerization stage, which is composed of an aqueous emulsion of the polymer according to the invention, is then treated in order to separate the said polymer therefrom. To do this, it is possible, for example, to subject the emulsion, according to the surfactant used, to a coagulating treatment by bringing into contact with a saline solution (CaCl$_2$ or AlCl$_3$) or a solution acidified with concentrated sulfuric acid and then to separate, by filtration, the solid product resulting from the coagulating, the said solid product then being washed and dried to give a graft copolymer as a powder. It is also possible to recover the polymer contained in the emulsion by using a spray-drying technique, drum drying, freeze-drying or other means known in the art.

The resulting additive exists in the form of a powder, the particle size of which can range from a few microns, for example 0.05 to 5 microns, to 200 to 450 microns, the said particle size depending on the technique used to separate the polymer from the emulsion polymerization mixture.

In this preferred embodiment the core-shell polymer of the invention are useful as impact modifiers for polymers including thermoplastics. Plastic materials benefiting from the use of the novel impact modifiers include, but are not limited to polyvinyl chloride, chlorinated polyvinyl chloride, polyethylene terephthalate, polycarbonate, polymethymethacrylate, (meth)acrylic copolymers, especially copolymers of methyl methacrylate with acrylates.

The core-shell impact modifier is blended with the plastic material at a level of from 1 to 70 percent by weight and preferably 3 to 60 percent by weight, based on the weight of the plastic material. The impact modified thermoplastic composition according to the invention can be prepared by any other method which makes it possible to produce a homogeneous mixture containing a thermoplastic polymer, the impact additive according to the invention and optionally other additives. It is possible, for example, to dry-mix the ingredients constituting the resin composition, then to extrude the resulting mixture and to reduce the extrudate to pellets. When the thermoplastic polymer is obtained by emulsion polymerization, it may be convenient to mix the emulsion containing the core-shell additive according to the invention with the emulsion of the thermoplastic polymer and to treat the resulting emulsion in order to separate therefrom the solid product which it contains, as described above with respect to the separation of the core-shell polymer.

Additives, other than the impact modifier, may optionally be present in the resin compositions. In addition to the plastic material and the impact modifier, other additives may also be added at usual levels. Typical additives include, but are not limited to, processing aids, heat stabilizers, light stabilizers, UV absorbers, lubricants, pigments, dyes, plasticizers, antioxidants.

Advantages of the core-shell polymer of the present invention are that it enables a "better" spray drying in that a higher minimum filming temperature (MFT) may be achieved without increasing the amount of monomer used to form the outer shell layer. The higher MFT allows for higher processing temperatures in the isolation step such as spray-drying and therefore higher production efficiency. The core-shell particles of the present invention may be combined with other solid particles to further improve the MFT.

Since the core-shell particles of the invention exhibit less blockiness, they are also more easily processed during a melt process, and, and also to an enhancement of optical properties.

The core-shell latex polymers of the invention have been found to exhibit improved latex stability under high shear conditions.

An additional advantage of the present invention is that when combined with thermoplastics by extrusion, it creates fewer gels or aggregates in the final product. The existence of a more uniform distribution of an impact modifier in the final product leads to both a more impact-resistance product. Therefore, the present invention has higher efficiency when toughening thermoplastic polymer such as methylmethacrylate copolymers. Core-shell polymers containing hydrophilic monomers in the shell are observed to provide higher toughness values than similar core-shell polymers without hydrophilic monomers in the shell. Furthermore, the product produced using the core-shell impact modifiers of the present invention have better surface gloss and improved optical properties. These observed properties likely result from the better dispersion and reduced agglomeration of the impact modifiers during processing into the base plastic.

The following examples are intended to illustrate further various aspects of the present invention, but are not intended to limit the scope of the invention in any aspect.

EXAMPLES

Example 1 (Comparative)

The following procedure was used to synthesize a multi-stage impact modifier having a hard-core, an elastomeric or soft layer and a hard final shell (see FIG. 3). The ratio of the three stages was 35//45//20 with each polymer stage having a refractive index between 1.460 to 1.500.

The compositions of the three stages were
  Stage 1: 74.8/25/0.2 MMA/EA/ALMA
  Stage 2: 83.5/15.5/1.0 BA/Sty/ALMA
  Stage 3: 95/5 MMA/EA where,
  MMA=methyl methacrylate
  EA=ethyl acrylate
  BA=butyl acrylate
  Sty=styrene
  ALMA=allyl methacrylate A monomer charge consisting of 14% of Stage 1 was emulsified in water using potassium dodecyl benzene sulfonate as the emulsifier and using potassium carbonate to control the pH was polymerized using potassium persulfate at elevated temperatures. The remaining portion of Stage 1 was then added to the preformed polymer emulsion and was polymerized using potassium persulfate at elevated temperatures controlling the amount of soap added to prevent the formation of a significant number of new particles. The Stage 2 monomers were then added and polymerized using potassium persulfate at elevated temperatures controlling the amount of soap added to prevent the formation of a significant number of new particles. The third stage monomers were then polymerized using potassium persulfate at elevated temperatures and again controlling the amount of soap added to prevent the formation of a significant number of new particles.

Example 2

This polymer was prepared in a manner similar to Example 1 except that it had different stage compositions ratios:

The ratio of the three stages was 35//45//20

The compositions of the stages were.
  Stage 1: 74.8/25/0.2 MMA/EA/ALMA
  Stage 2: 83.5/15.5/1.0 BA/Sty/ALMA
  Stage 3: (95-X)/5/X MMA/EA/HEMA where,

X=5

HEMA=2-hydroxy-ethyl methacrylate

Example 3

The same as Example 2 except that X=10.

Example 4

The same as Example 2 except that HEA replaced HEMA in the composition and HEA=2-hydroxy ethyl acrylate.

Examples 5–8

The polymers of Examples 1–4 were isolated by coagulation, freeze-drying, or spray-drying and then blended with poly (methyl methacrylate-co-ethyl acrylate) matrix (50/50 ratio) in the melt on an extruder. Samples 5–8 were prepared according to Table 1

TABLE 1

|  |  | Composition |
| --- | --- | --- |
| Example 5 (Comparative) | 50% Example 1 | 50% poly (methyl methacrylate-co-ethyl acrylate) 75/25 MMA/EA |
| Example 6 | 50% Example 2 | 50% poly (methyl methacrylate-co-ethyl acrylate) 75/25 MMA/EA |
| Example 7 | 50% Example 3 | 50% poly (methyl methacrylate-co-ethyl acrylate) 91/9 MMA/EA |
| Example 8 | 50% Example 4 | 50% poly (methyl methacrylate-co-ethyl acrylate) 75/25 MMA/EA |

Example 9

The same as Example 1 except that Stage 1 composition is 87.8/12.0/0.2 for MMA/EA/ALMA.

Example 10

The same as Example 2 except that Stage 1 composition is 87.8/12.0/0.2 for MMA/EA/ALMA The minimum filming temperature of Examples 1–4 were measured by draw-casting the latexes across a metal bar that is heated in a manner to maintain a constant gradient of temperature across the bar. Through the appropriate choice of the temperature range the transition temperature between a continuous, tough film and a friable, broken film was measured and called the MFT, or minimum filming temperature. The results of the characterization are summarized in Table 2. The MFT is related to the glass transition of the shell polymer and the degree of coverage of the elastomeric core. An indication of better coverage of the elastomer-containing core by the shell is a higher MFT. Therefore, the data in Table 2 clearly shows the effect of hydrophilic monomers in the shell through improved shell coverage and higher MFT. A polymer latex with a higher MFT is often easier to isolate in a powder form than a latex with a lower MFT.

The stability of the polymer emulsions to shear was measured for Examples 9 and 10 using a standard laboratory liquid blender. If a polymer latex is not stable to shear, severe coagulation will occur in a short period of blending time. A longer blending time without coagulation is indicative of a polymer latex with better shear stability. The time at which the blending causes severe coagulation is termed the "Blender Coagulation Time". The data for Example 9 and 10 in Table 2 shows that hydrophilic monomer in the shell improves the shear stability of the polymer latex. A high level of shear stability is desirable for processing of emulsions such as pumping and spray-drying.

TABLE 2

| Example # | MFT (° C.) | First Break Energy (Joules) | Blender Coagulation Time (minutes) |
| --- | --- | --- | --- |
| 1 Comparative | 29 | — | — |
| 2 | 52 | — | — |
| 3 | 55 | — | — |
| 4 | 47 | — | — |
| 5 Comparative | — | 9.2 | — |
| 6 | — | 6.9 | — |
| 7 | — | 11.1 | — |
| 8 | — | 14.0 | — |
| 9 | — | — | 4.7 |
| 10 Comparative | — | — | 7.3 |

Examples 5–8 were molded into 1/8" plaques and the energy required to initiate a crack during an instrumented dart impact test (called First Break Energy) was measured. The results of the characterization are summarized in Table 2. This table clearly shows the advantages of having improved coverage by the shell through the use of hydrophilic monomers.

Example 11

1053.97 demineralized water and 3.66 g sodium hydrogenphosphate are added into a 5 liter flask. The content is degassed with nitrogen. The temperature of the contents in the reactor is then brought to 178° F. while keeping the stirring speed at 140 rpm, after which a mixer of 74.42 g 2-ethylhexyl acrylate, 2.21 g styrene, 0.085 g butanediol diacrylate, 0.084 g diallyl malleate, 0.82 g sodium dodecylsulfosuccinate (75 wt % in water) and 52.75 g deminierialized water in pre-emulsion form are added into the reactor. 0.90 g potassium persulfate in 21.71 g water is injected into the reactor as initiator. The mixture is kept at 178° F. for 30 minutes.

Afterward, 1499.21 g of pre-emulsion consisting of 855.81 g 2-ethylhexyl acrylate, 25.46 g styrene, 0.98 g butanediol diacrylate, 0.97 g diallyl malleate, 9.42 g sodium dodecylsulfosuccinate (75 wt % in water) and 606.59 g deminerialized water is slowly added into the reactor over 126 minutes. At the same time, a separate solution of 1.32 g potassium persulfate in 31.80 g water is fed into the reactor over the same period.

After the feeding is completed, 0.26 g potassium persulfate in 6.17 g water and 0.38 g sodium metabisulphite in 7.33 g water are added to the reactor. The reaction is ten allowed to continue for one more hour. A latex is obtain with monomer conversion higher than 98%.

Example 12

2757.07 g of latex made according to Example 11 and 425.73 g water is added into a 5 liter reactor. The temperature of the content in the reactor is brought to 178° F. while stirring at 160 rpm. 0.47 g sodium formaldehyde sulphoxylate in 9.90 g water is added into the reactor, immediately after which a mixture of 228 g methyl methacrylate, 12 g glycidyl methacrylate and 3.6 g diisopropylbenzene hydroperoxide is added into the reactor over a period of one hour.

After the feed is completed, the contents of the reactor are maintained at 178° F. for another half hour. At the end of this period, 0.20 g sodium metabisulphite in 3.84 g water and 0.17 g in 4.50 g water are added into the reactor. The reaction mixture is then maintained at 178° F. for half hour, after which it is allowed to cooled to ambient temperature. The final conversion of the reaction is higher than 99%.

The solid contents of the latex can be recovered by freeze-thaw coagulation. The latex prepared based on above procedure is frozen at −20° C. and allowed to slowly thaw at ambient temperature which results in a slurry. It is then filtrated and the solids are dried in a ventilated oven at 45° C. A micrograph of the latex of Example 12 is shown in FIG. 5, and a picture of the dried solids product is shown in FIG. 7.

Example 13

2757.07 g of latex made according to Example 11 and 425.73 g water is added into a 5 liter reactor. The temperature of the content in the reactor is brought to 178° F. while stirring at 160 rpm. 0.47 g sodium formaldehyde sulphoxylate in 9.90 g water is added into the reactor, immediately after which a mixture of 216 g methyl methacrylate, 12 g hydroxyethyl methacrylate, 12 g glycidyl methacrylate and 3.6 g diisopropylbenzene hydroperoxide is added into the reactor over a period of one hour.

After the feed is completed, the contents of the reactor are maintained at 178° F. for another half hour. At the end of this period, 0.20 g sodium metabisulphite in 3.84 g water and 0.17 g in 4.50 g water are added into the reactor. The reaction mixture is then maintained at 178° F. for half hour, after which it is allowed to cooled to ambient temperature. The final conversion of the reaction is higher than 99%.

The solid contents of the latex can be recovered by freeze-thaw coagulation. The latex prepared based on above procedure is frozen at −20° C. and allowed to slowly thaw at ambient temperature that results in a slurry. It is then filtrated and the solids are dried in a ventilated oven at 45° C. A micrograph of the latex of Example 13 is shown in FIG. 6, and a picture of the dried solids product is shown in FIG. 8.

The latex prepared based on above procedure is then diluted and spun-cast onto a glass slide. The water in the latex evaporates during casting whereas the solid content forms an ultra-thin mono-layer on top of the glass slide. It is then observed under an Atomic Force Microscope following standard procedures.

The bright region of the micrograph in FIG. 5 corresponds to areas with rigid shell on the surface of the particle, whereas the dark region corresponds to exposed rubber core. Many particles in example 12 are only slightly, if at all covered by the shell polymers. In many case, individual particles cannot be clearly identified. On the contrary, FIG. 6 (micrograph of Example 13) showed well-defined array of particles with almost complete shell coverage. The results clearly indicate that by using hydrophilic comonomers in the shell stage, shell coverage of the particle is dramatically improved.

The differences in shell coverage are directly translated to powder performance as exemplified in the optical micrographs shown in FIG. 7 and FIG. 8. Comparative example 12 appears as an elatomeric chunk and is impossible to separate. In contrary, example 13 is powder-like and can be handled.

What is claimed is:

1. A core-shell polymer, comprising:
 a) a core comprising an elastomeric polymer, wherein said elastomeric polymer has a glass transition temperature less than 25° C., and wherein said core comprises from 85 to 95 weight percent of said core-shell polymer;
 b) a shell comprising a hydrophilic shell copolymer wherein said hydrophilic shell copolymer is derived from a hydrophilic component and at least one hydrophobic monomer copolymerizable with said hydrophylic component said hydrophilic component comprising from 0.5 percent to 30 percent by weight of the monomers and components from which said shell copolymer is derived arid said hydrophilic shell copolymer comprises at least 5 percent by weight of the shell; and wherein said shell comprises from 5 to 15 weight percent of said core-shell polymer, wherein said hydrophilic monomer has a solubility in water of at least 10 grams of monomer per 100 grams of water.

2. The core-shell polymer of claim 1 wherein said core comprises an acrylic elastomer.

3. The care-shell polymer of claim 1 wherein said core is comprised of at least two stages, with one stage having a Tg of greater than 25° C.

4. The core-shell polymer of claim 1 wherein said hydrophilic copolymer shell layer is directly outside the outermost elastomeric core layer.

5. The core-shell polymer of claim 1 wherein the polymer is formed by emulsion polymerization.

6. The core-shell polymer of claim 1 wherein said polymer is a dry powder.

7. The core-shell polymer of claim 6 wherein said powder is dried by spray drying.

8. The core-shell polymer of claim 1 wherein said hydrophilic monomer is selected from the group consisting of 2-hydroxylethyl methacrylate, 2-hydroxylethyl acrylate, methacrylic acid, acrylic acid, and mixtures thereof.

9. An impact modified engineering plastic comprising:
 a) 0.5 to 77 percent by weight of the polymer of claim 1; and
 b) 30 to 99 percent by weight of an engineering plastic.

10. The impact modified engineering plastic of claim 9 wherein said plastic is selected from the group consisting of polyvinyl chloride, chlorinated polyvinyl chloride, polymethymethacrylate, poly(methylmethacrylate-co-ethyl acrylate) thermoplastics, polyalkylene terephthalate, polyamide and polycarbonate.

11. The core-shell polymer of claim 1, wherein the elastomeric polymer of said core is cross-linked and/or graftlinked.

* * * * *